(12) United States Patent
Nagata et al.

(10) Patent No.: US 10,061,995 B2
(45) Date of Patent: Aug. 28, 2018

(54) IMAGING SYSTEM TO DETECT A TRIGGER AND SELECT AN IMAGING AREA

(71) Applicant: PIONEER CORPORATION, Kanagawa (JP)

(72) Inventors: Hiroshi Nagata, Kanagawa (JP); Makoto Kurahashi, Kanagawa (JP); Yugo Ishikawa, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 222 days.

(21) Appl. No.: 14/900,705

(22) PCT Filed: Jul. 1, 2013

(86) PCT No.: PCT/JP2013/068062
§ 371 (c)(1),
(2) Date: Dec. 22, 2015

(87) PCT Pub. No.: WO2015/001606
PCT Pub. Date: Jan. 8, 2015

(65) Prior Publication Data
US 2016/0171320 A1 Jun. 16, 2016

(51) Int. Cl.
*G06K 9/00* (2006.01)
*B60K 15/04* (2006.01)
(Continued)

(52) U.S. Cl.
CPC .......... *G06K 9/00845* (2013.01); *B60K 15/04* (2013.01); *B60K 37/06* (2013.01);
(Continued)

(58) Field of Classification Search
CPC .......... G06K 9/00845; G06K 9/00604; B60K 15/04; B60K 37/06; B60K 2350/1052;
(Continued)

(56) References Cited

U.S. PATENT DOCUMENTS 9,315,196 B2 4/2016 Heisterkamp
2005/0231599 A1* 10/2005 Yamasaki ............... G02B 3/14
348/207.99
(Continued)

FOREIGN PATENT DOCUMENTS

DE 102011010594 8/2012
JP 10-40386 2/1998
(Continued)

OTHER PUBLICATIONS

Michael J. Reale et al., "A Multi-Gesture Interaction System Using a 3-D Iris Disk Model for Gaze Estimation and an Active Appearance Model for 3-D Hand Pointing", IEEE Transactions on Multimedia, IEEE Service Center, Piscataway, NJ, US, vol. 13, No. 3, Jun. 1, 2011, pp. 474-486, XP011322965.
(Continued)

*Primary Examiner* — Jay Patel
*Assistant Examiner* — Marnie Matt
(74) *Attorney, Agent, or Firm* — Young & Thompson (57) ABSTRACT

An imaging system (CM, 100) is provided with: an imaging device (CM) configured to selectively image a first imaging area and a second imaging area, which is larger than the first imaging area, the first imaging area being used to detect eyes of a user (1), the second imaging area being used to detect a body of the user; a detecting device (110, 120, 160) configured to detect trigger operation of the user; and a selecting device (13) configured to select the first imaging area or the second imaging area on the basis of a detection result of the trigger operation.

5 Claims, 7 Drawing Sheets

(51) Int. Cl.
   *B60K 37/06* (2006.01)
   *B60R 1/00* (2006.01)
   *G06F 3/00* (2006.01)
   *G06F 3/01* (2006.01)
   *H04N 5/232* (2006.01)

(52) U.S. Cl.
   CPC ............... *B60R 1/00* (2013.01); *G06F 3/005* (2013.01); *G06F 3/013* (2013.01); *G06F 3/017* (2013.01); *G06K 9/00604* (2013.01); *H04N 5/23219* (2013.01); *B60K 2350/1052* (2013.01); *B60K 2350/2013* (2013.01); *B60R 2300/8006* (2013.01)

(58) Field of Classification Search
   CPC . B60K 2350/2013; G06F 3/005; G06F 3/013; G06F 3/017; H04N 5/23219; B60R 2300/8006
   USPC ........................................................... 348/77
   See application file for complete search history.

(56) References Cited

U.S. PATENT DOCUMENTS

| | | | | |
|---|---|---|---|---|
| 2008/0136916 | A1* | 6/2008 | Wolff | G06F 3/012 |
| | | | | 348/169 |
| 2009/0009531 | A1* | 1/2009 | Sudo | H04N 5/23219 |
| | | | | 345/629 |
| 2010/0033567 | A1* | 2/2010 | Gupta | G08B 13/1963 |
| | | | | 348/143 |
| 2010/0141800 | A1* | 6/2010 | Katayama | H04N 5/2256 |
| | | | | 348/240.1 |
| 2012/0133754 | A1* | 5/2012 | Lee | G06F 3/013 |
| | | | | 348/78 |
| 2012/0154522 | A1* | 6/2012 | Yoo | H04N 5/232 |
| | | | | 348/36 |
| 2012/0257035 | A1 | 10/2012 | Larson | |
| 2013/0077831 | A1 | 3/2013 | Momozono et al. | |
| 2013/0229528 | A1* | 9/2013 | Taylor | G01S 3/7864 |
| | | | | 348/169 |
| 2014/0005857 | A1* | 1/2014 | Heisterkamp | G06F 3/017 |
| | | | | 701/1 |
| 2014/0253542 | A1* | 9/2014 | Jung | G06T 3/40 |
| | | | | 345/419 |
| 2015/0367859 | A1* | 12/2015 | Roth | B60K 37/00 |
| | | | | 701/36 |

FOREIGN PATENT DOCUMENTS

| | | |
|---|---|---|
| JP | 2000-292852 | 10/2000 |
| JP | 2005-087284 | 4/2005 |
| JP | 2005-138755 | 6/2005 |
| JP | 2007-164814 | 6/2007 |
| JP | 2007-281647 | 10/2007 |
| JP | 2008-033718 | 2/2008 |
| JP | 2009-237776 | 10/2009 |
| JP | 2010-141376 | 6/2010 |
| JP | 4992764 | 5/2012 |
| JP | 2012-221498 | 11/2012 |
| JP | 2013-069224 | 4/2013 |

OTHER PUBLICATIONS

International Search Report—PCT/JP2013/068062—dated Sep. 10, 2013.

* cited by examiner

IMAGING SYSTEM TO DETECT A TRIGGER AND SELECT AN IMAGING AREA

TECHNICAL FIELD

The present invention relates to an imaging system including an imaging apparatus.

BACKGROUND ART

Regarding a technology of imaging a user's face, there are Patent Literatures 1 to 4.

The Patent Literature 1 describes a technology of analyzing eye position data and recognizing irises by using a camera configured to photograph a whole face and a moving camera configured to photograph an eye portion. The Patent Literature 2 describes a technology of photographing a face image, determining a face size, and zooming it at an appropriate field angle or view angle. The Patent Literature 3 describes a technology of changing a menu display of an electronic camera depending on the presence or absence of face recognition. The Patent Literature 4 describes a technology in which there are provided a face recognizing device and a device configured to detect a movement in a face area, and in which if there is a movement of a cosmetic tool or the like, the surroundings of a portion with the movement are enlarged and displayed.

Moreover, recently, with such imaging technologies as a background, there has been proposed a method of detecting the user's line-of-sight direction and using a detection result to improve safety during driving (e.g. refer to Patent Literatures 5 to 7). Moreover, there is also proposed an apparatus configured to use the detected line-of-sight direction to operate a personal computer, or the like. There are various methods of detecting the line-of-sight direction; for example, there are known a method of applying near infrared rays and using an image of a pupil of an eyeball and a Purkinje image, a method of measuring the line-of-sight direction from an eyeball central position obtained from an edge of the iris and a face position, and the like.

On the other hand, as a technology to which the user's image is applied, aside from the technology in which the line-of-sight direction is used, there is a technology in which the user's gesture is used. For example, there are an apparatus configured to use a gesture operation using a hand(s) so that a driver operates equipment (refer to Patent Literatures 8 and 9), an apparatus configured to use the gesture operation to operate a personal computer on a desk, or the like. For example, a virtual image display apparatus in the Patent Literature 8 is provided with: a viewpoint detection camera configured to photograph the driver's eyes; and a gesture detection camera to photograph the driver's hand(s). If the driver performs an operation of pointing at a displayed virtual image with his or her fingertip, image recognition processing is performed on images photographed by the viewpoint detection camera and the gesture detection camera. Then, the driver's eye position and fingertip position are detected, and the driver's line of sight is specified. The display of a gaze virtual image on the specified line of sight is controlled on the basis of a display control command.

CITATION LIST

Patent Literature

Patent Literature 1: Japanese Patent Application Laid Open No. Hei 10-40386

Patent Literature 2: Japanese Patent Application Laid Open No. 2000-292852
Patent Literature 3: Japanese Patent Application Laid Open No. 2007-281647
Patent Literature 4: Japanese Patent Application Laid Open No. 2008-33718
Patent Literature 5: Japanese Patent No. 4992764
Patent Literature 6: Japanese Patent Application Laid Open No. 2009-237776
Patent Literature 7: Japanese Patent Application Laid Open No. 2005-87284
Patent Literature 8: Japanese Patent Application Laid Open No. 2007-164814
Patent Literature 9: Japanese Patent Application Laid Open No. 2005-138755

SUMMARY OF INVENTION

Technical Problem

In order to detect the line-of-sight direction, it is necessary to analyze an image of the user's eye portion. For example, in order to detect the line-of-sight direction with accuracy of the order of one degree, it is said that about 70 pixels are required for an iris diameter.

Now, it is assumed that a single imaging apparatus is used to detect both the line-of-sight direction and the gesture and that the both the line-of-sight direction and the gesture are used for information display. The detection of the line-of-sight direction and the detection of the gesture have a common point that the user's imaging results are used; however, the detection of the line-of-sight direction requires a high resolution image regarding the user's eyes, as described above, and the detection of the gesture requires not only an image of the face but also a larger image of a body, such as the user's hands and fingers.

Therefore, if the detection of the line-of-sight direction and the detection of the gesture are to be realized only by the single imaging apparatus, both the resolution and the field angle (i.e. size of an imaging area) are required. In general, an imaging apparatus provided with both the resolution and the field angle is expensive, and an image processing circuit requires a high processing capability to process high resolution image data. Normally, the processing capability of the image processing circuit is proportional to cost. In other words, a cost increase is a hardly avoidable problem in order to realize both the detection of the line-of-sight direction and the detection of the gesture only by using the single imaging apparatus.

Such a situation, however, is not considered in the aforementioned Patent Literatures. In other words, the aforementioned Patent Literatures do not disclose or imply a technical idea that leads to solve the problems.

In view of such problems, it is therefore at least one object of the present invention to provide an imaging system in which the detection of the line-of-sight direction and the detection of the gesture can be realized only by the single imaging apparatus without causing a cost increase.

Solution to Problem

In order to solve the above-mentioned problem, the imaging system is provided with: an imaging device configured to image a first imaging area and a second imaging area, which is larger than the first imaging area, the first imaging area being used to detect a user's line-of-sight, the second imaging area being used to detect a gesture including the user's upper body; a detecting device configured to detect the user's trigger operation; and a selecting device configured to select the first imaging area or the second imaging area on the basis of a detection result of the trigger operation.

In order to solve the above-mentioned problem, the imaging method is an imaging method in an imaging system is provided with: an imaging device configured to image a first imaging area and a second imaging area, which is larger than the first imaging area, the first imaging area being used to detect a user's line-of-sight, the second imaging area being used to detect a gesture including the user's upper body, said imaging method is provided with: a detecting process of detecting the user's trigger operation; and a selecting process of selecting the first imaging area or the second imaging area on the basis of a detection result of the trigger operation.

In order to solve the above-mentioned problem, the computer program makes a computer apparatus function as the imaging system.

In order to solve the above-mentioned problem, the recording medium is a recording medium on which the computer program is recorded.

DESCRIPTION OF EMBODIMENTS

<Embodiment of Imaging System>

An embodiment of the imaging system of the present invention is an imaging system is provided with: an imaging device configured to image a first imaging area and a second imaging area, which is larger than the first imaging area, the first imaging area being used to detect a user's line-of-sight, the second imaging area being used to detect a gesture including the user's upper body; a detecting device configured to detect the user's trigger operation; and a selecting device configured to select the first imaging area or the second imaging area on the basis of a detection result of the trigger operation.

In the embodiment of the imaging system of the present invention, the imaging device is configured to image the first imaging area and the second imaging area. The expression "to image the imaging area" means to obtain a picture, or a video regarding the imaging area.

The first imaging area is an imaging area that is used, can be used, or is suitable to be used to detect the user's line-of-sight, and that includes, for example, the user's pupils, eyes, eye periphery, upper half of the user's face, or the like, as a preferred form. Alternatively, the first imaging area may be set, for example, as an imaging area in which a ratio of the user's face or head occupied in the first imaging area is greater than or equal to a predetermined ratio.

The second imaging area is an imaging area that is used, can be used, or is suitable to be used to detect the gesture including the user's upper body, and that includes the upper body or a body part upper than a chest or the like. The second imaging area is an imaging area which is larger than the first imaging area. The imaging area of the imaging device is not necessarily limited only to the first and second imaging areas. Moreover, the second imaging area may be an imaging area including at least a part of the first imaging area.

Various known technologies can be applied to switching of the imaging area between the first imaging area and the second imaging area having a wider field angle than that of the first imaging area, or switching of an imaging mode associated with the imaging area. The switching of the imaging area may be realized, for example, by a zoom in/out switching function of the imaging device. If the imaging device has a single focus, the switching may be realized by widening the field angle by using a wide conversion lens (i.e. by switching to the second imaging area), or may be realized by enlargement by a tele-conversion lens (i.e. by switching to the first imaging area).

Here, the switching of the imaging area is performed on the basis of the detection result of the user's trigger operation. Namely, the imaging system according to the embodiment is configured in such a manner that the selecting device selects the first imaging area or the second imaging area on the basis of the detection result of the trigger operation.

The trigger operation is an operation premised on implementation by the user based on his or her intention, and conceptually includes all the operations that can be performed by the user and the operations that can be detected. For example, the trigger operation can include the user's gesture, the user's utterance, or an operation of a physically operating device, or the like. The trigger operation ideally corresponds to, but does not necessarily correspond to, one imaging area to be selected out of the first imaging area and the second imaging area. Specifically, the imaging area may be alternately selected in order of the first imaging area, the second imaging area, the first imaging area, and so on, every time a certain single trigger operation is detected. Various known methods can be applied to the detection of the trigger operation, according to the type of the trigger operation.

In the configuration that an imaging result of the imaging device is used to detect the line-of-sight direction and to detect the gesture, as described above, both the wide field angle and high resolution are required. Strictly speaking, however, the resolution, and particularly, the resolution of an image of the eyes is more important than the field angle in the detection of the line-of-sight direction, and the field angle is more important than the resolution in the detection of the gesture. Namely, practically, both the field angle and the resolution are not required at the same time.

Therefore, the resolution of the eye portion in the second imaging area may be low and not necessarily high enough to detect the line-of-sight direction. On the other hand, the resolution of the eye portion in the first imaging area can be relatively improved by enlarging the imaging area and relatively narrowing the field angle in comparison with the second imaging area.

According to the embodiment of the imaging system, it is possible to reduce the resolution of the imaging device, which influences cost, while ensuring the accuracy of detecting the line-of-sight direction, on the basis of the principle as described above. In other words, the detection of the line-of-sight direction and the detection of the gesture can be realized by using a single imaging apparatus without causing a cost increase.

In one aspect of the embodiment of the imaging system of the present invention, the imaging system is provided with a controlling device configured to control said imaging device to image the selected the first or second imaging area.

According to this aspect, the imaging area is switched in accordance with the trigger operation that promotes the switching from the first (or second) imaging area to the second (or first) imaging area, and if the first (or second) imaging area needs to be imaged, the first (or second) imaging area can be accurately imaged.

It is therefore possible to prevent a situation in which the imaging of the second (or first) imaging area is continued even though the imaging of the first (or second) imaging area is required, or a similar situation.

In another aspect of the embodiment of the imaging system of the present invention, the trigger operation includes at least one of the gesture, utterance, and an input operation via a predetermined input device.

According to this aspect, appropriate operations can be set as the user's trigger operation in accordance with the installation environment and the application of the imaging system. Moreover, those operations are reasonable and appropriate as the trigger operation that is considered in the imaging system according to the embodiment of the present invention.

In another aspect of the embodiment of the imaging system of the present invention, the second imaging area includes at least a part of the first imaging area, and resolution of the first imaging area when the first imaging area is selected is higher than resolution of the first imaging area when the second imaging area is selected.

According to this aspect, the switching of the imaging area to the second imaging area can be realized, for example, only by switching the field angle of the imaging device. In other words, the resolution of an imaging element of the imaging device (e.g. pixel number) can be set as a fixed value.

It is therefore possible to efficiently realize the detection of the line-of-sight direction and the detection of the gesture, while ensuring an effect of suppressing an image processing load and preventing high cost.

In another aspect of the embodiment of the imaging system of the present invention, said selecting device selects the first imaging area if the user's gesture is not detected in a state in which the second imaging area is selected.

According to this aspect, the second imaging area can be imaged as long as the gesture is detected, and the opportunity of detecting the line-of-sight direction is preferably ensured. Moreover, the user's special trigger operation is not required when it is required to switch from the second imaging area to the first imaging area, and it is thus advantageous for the user.

In another aspect of the embodiment of the imaging system of the present invention, said selecting device selects the second imaging area if it is detected that a part of the user's face is obstructed, as the trigger operation, in a state in which the first imaging area is selected.

If the gesture is used as the trigger operation, the gesture needs to a gesture that can be detected in the first imaging area having a narrow field angle. On the other hand, considering that the first imaging area preferably includes the face, if the gesture with such restriction is made, a part of the user's face is highly likely obstructed.

Therefore, the obstructed part of the face can be detected for the gesture as the trigger operation. In comparison with a case of image analysis of the gesture by the user, it is easy to detect the presence or absence of face parts that constitute the face. According to this aspect, it is therefore possible to detect the gesture as the trigger operation, relatively easily.

<Embodiment of Imaging Method>

An embodiment of the imaging method of the present invention is an imaging method in an imaging system is provided with: an imaging device configured to image a first imaging area and a second imaging area, which is larger than the first imaging area, the first imaging area being used to detect a user's line-of-sight, the second imaging area being used to detect a gesture including the user's upper body, said imaging method is provided with: a detecting process of detecting the user's trigger operation; and a selecting process of selecting the first imaging area or the second imaging area on the basis of a detection result of the trigger operation.

According to the embodiment of the imaging method, due to the detecting process and the selecting process that realize the same effects as those of the detecting device and the selecting device of the imaging system according to the embodiment, the detection of the line-of-sight direction and the detection of the gesture can be realized by using a single imaging apparatus without causing a cost increase and an apparatus configuration increase, as in the imaging system in the embodiment described above.

<Embodiment of Computer Program>

An embodiment of the computer program of the present invention makes a computer apparatus function as the imaging system according to any one of above-mentioned imaging systems.

The embodiment of the imaging system of the present invention described above can be relatively easily realized as a computer system reads and executes the computer program from a fixed storage apparatus, which can be attached to or detached from the computer system, such as a universal serial bus (USB) memory or a recording medium for storing the computer program, like a read only memory (ROM), a compact disc read only memory (CD-ROM), a DVD read only memory (DVD-ROM), and a hard disk, or as it executes the computer program after downloading the program to the computer system through a communication device.

In response to various aspects of the embodiment of the imaging system of the present invention, the embodiment of the computer program of the present invention can also adopt various aspects.

<Embodiment of Recording Medium>

An embodiment of the recording medium of the present invention is a recording medium in which the embodiment of the computer program is recorded.

According to the embodiment of the recording medium of the present invention, the embodiment of the imaging system of the present invention described above can be relatively easily realized as the recorded embodiment of the computer program of the present invention can be read and executed in a computer system by mounting the recording medium in or connecting it to the computer system or by inserting it to a proper reading apparatus provided for or connected to the computer system.

The operation and other advantages of the present invention will become more apparent from the embodiments and an example explained below.

EXAMPLE

Hereinafter, with reference to the drawings, an image display apparatus 10 will be explained as a preferred example of the present invention.

<Configuration of Example>

Figure 1:
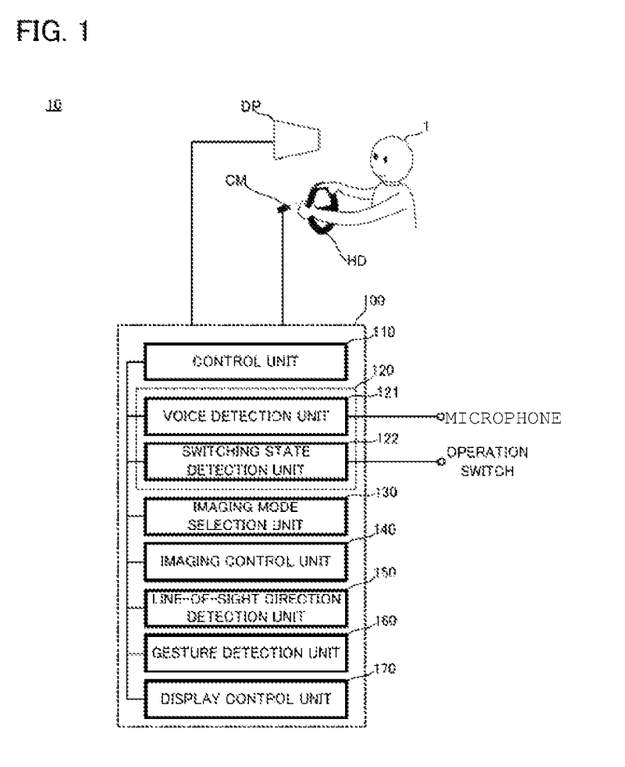
FIG. 1 is a block diagram illustrating an information display system according to an example of the present invention.

Firstly, with reference to FIG. 1, a configuration of the image display apparatus 10 will be explained. FIG. 1 is a block diagram illustrating the information display system 10.

In FIG. 1, the information display system 10 is mounted on a not-illustrated vehicle. The information display system 10 is an apparatus configured to provide a user 1, who is a driver of the vehicle, with various information. The information display system 10 is provided with a control apparatus 100, a display DP, and imaging apparatus CM. Each of the display DP and the imaging apparatus CM is electrically connected to the control apparatus 100.

The information display system 10 is configured as a part of a not-illustrated car navigation system. The information display system 10 can therefore provide the user 1 with the various information, such as vehicle position information, map information, surrounding facility information, and road information. Of course, the application of the imaging system according to the present invention is not limited to a car navigation field. For example, it can be also applied to information display in a personal computer apparatus.

In the information display system 10, the control apparatus 100 and the imaging apparatus CM constitute one example of the "imaging system" according to the present invention.

The display DP is a display apparatus, which is fixed in a state of being hung on a ceiling between a windshield and the vehicle driver's seat. The display DP has a display screen used for visual recognition by the user 1. Display content of the display DP is controlled by the control apparatus 100, which is electrically connected to the display DP.

The imaging apparatus CM is a digital video camera, which is fixed near a steering column positioned on the rear side of a steering wheel HD of the vehicle so as to image the user 1, and which is one example of the "imaging device" of the present invention. The operation of the imaging apparatus CM is controlled by the control apparatus 100, which is electrically connected to the imaging apparatus CM.

The imaging apparatus CM is equipped with an image sensor (e.g. including a CCD, a CMOS sensor, etc.) having certain resolution (i.e. pixel number), and an imaging area of the image sensor can be switched between a telephoto side imaging area and a wide-angle side imaging area. The imaging area of the imaging apparatus CM corresponds to an imaging mode selected by an imaging mode selection 130 described later, in a one-to-one manner. Namely, the imaging area of the imaging apparatus CM is controlled to be the wide-angle side imaging area optimized for the detection of the user 1's gesture (i.e. one example of the "second imaging area" according to the present invention) if a wide-angle mode is selected as the imaging mode. Moreover, the imaging area is controlled to be the telephoto side imaging area optimized for the detection of the user 1's line-of-sight direction (i.e. one example of the "first imaging area" according to the present invention) if a telephoto mode is selected as the imaging mode.

The switching of the imaging area in the imaging apparatus CM is realized by a zoom in/out function of the imaging apparatus CM. In other words, if a zoom-in control signal is supplied from an imaging control unit 140 described later, a drive control circuit inside the imaging apparatus CM drives a lens motor, by which a part of the first imaging area is enlarged, and the imaging area is switched to the telephoto side imaging area. On the other hand, if a zoom-out control signal is supplied from the imaging control unit 140, the drive control circuit inside the imaging apparatus CM drives the lens motor, by which the imaging area is enlarged, and the imaging area is switched to the wide-angle side imaging area.

The switching of the imaging area as described above is merely one example. For example, even if the imaging apparatus CM does not have the zoom in/out function, a function equivalent to the zoom-in can be realized by a tele-conversion lens, and a function equivalent to the zoom-out can be realized by a wide conversion lens. In this case, it may be enough to provide a lens attachment/detachment in the imaging apparatus CM or its peripheral region.

Figure 2A:
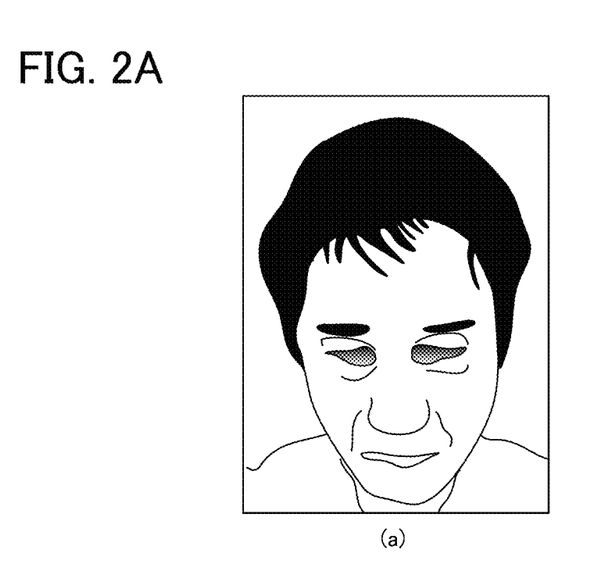
FIG. 2A and FIG. 2B are diagrams explaining an installation position of an imaging apparatus.
Figure 2B:
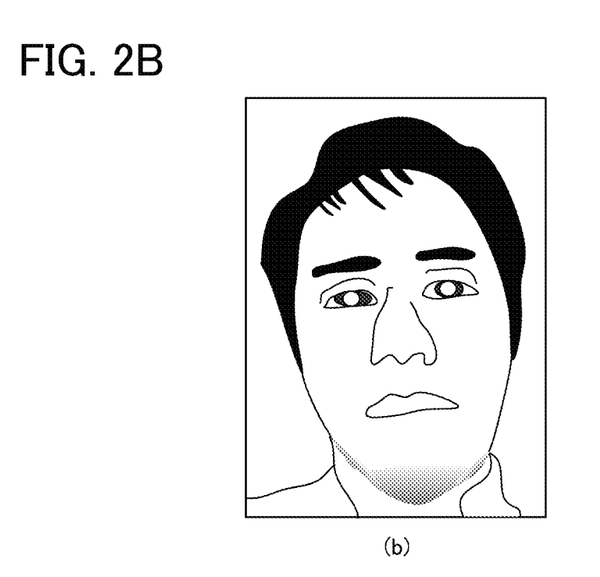

Now, with reference to FIG. 2A and FIG. 2B, an installation position of the imaging apparatus CM will be additionally explained. FIG. 2A and FIG. 2B are diagrams explaining the installation position of the imaging apparatus CM.

FIG. 2A and FIG. 2B are diagrams obtained by imaging the user 1's face in a certain sitting posture in different directions. Specifically, FIG. 2A is a diagram imaged from the front, and FIG. 2B is a diagram imaged from a lower side than FIG. 2A.

In order to detect the line-of-sight direction of the user 1, proper resolution is required in the peripheral region of the eye of the user 1. In FIG. 2A, however, pupils are hindered by eyelids of the user 1 and cannot sufficiently imaged. In FIG. 2B, pupils are imaged without being hindered by eyelids of the user 1.

For those reasons, the imaging apparatus CM is placed near the steering column, which is positioned on the rear side of the steering wheel HD of the vehicle, so as to image the user 1 in a direction corresponding to FIG. 2B. Moreover, even if the detection of the line of sight is used to operate a personal computer, for the same reasons, the imaging apparatus is preferably placed in a position in which the eye peripheral region of the user 1 can be imaged from the front and from an obliquely lower side of the user 1.

The control apparatus 100 is a computer apparatus configured to control the operation of the information display system 10. The control apparatus 100 is provided with a control unit 110, an operation detection unit 120, an imaging mode selection unit 130, the imaging control unit 140, a line-of-sight direction detection unit 150, a gesture detection unit 160, and a display control unit 170.

The control unit 110 is an arithmetic processing apparatus provided with a central processing unit (CPU), a read only memory (ROM), a random access memory (RAM), and the like. The ROM of the control unit 110 stores therein a control program regarding various controls performed by the control unit 110. Each unit of the control apparatus 100 is configured in such a manner that the operation thereof is controlled by the control program. The control program also includes a control program regarding an imaging mode control process described later.

The control program regarding the imaging mode control process is one example of the "computer program" according to the present invention. Moreover, the ROM is one example of the "recording medium" according to the present invention.

Since the ROM is a nonvolatile storage apparatus, the control program regarding the imaging mode control process is provided in advance for the control unit 110 in the example. The control program, however, may be written on the RAM or another volatile storage apparatus that can be provided for the control apparatus 100. In this case, update and maintenance of the control program or the like can be relatively easily performed. It is also possible to take such a measure as distributing the control program on a network or distributing a recording medium on which the control program is recorded.

The operation detection unit 120 is configured to detect a trigger operation of the user 1 that promotes the switching of the imaging mode of the imaging apparatus CM, and is one example of the "detecting device" according to the present invention.

The operation detection unit 120 is provided with a voice detection unit 121 and a switching state detection unit 122.

The voice detection unit 121 is electrically connected to a microphone configured to collect the user 1's voice, and can analysis a voice signal associated with the voice and specify content of the user 1's utterance. For the voice analysis of the voice detection unit 121, a voice analysis method in a known voice sound input apparatus can be used.

The switching state detection unit 122 is electrically connected to an operation switch that can be operated by the user 1, and can specify an operating state of the operation switch. The operation switch may be a pressing type switch, a toggle type switch, or a lever type switch. The operation switch in the example is provided with an ON switch corresponding to an ON operation and an OFF switch corresponding to an OFF operation. The ON operation and the OFF operation will be described later.

The imaging mode selection unit 130 selects the imaging mode of the imaging apparatus CM, and is one example of the "selecting device" according to the present invention.

The imaging control unit 140 is a control unit configured to control the operation of the imaging apparatus CM. The imaging control unit 140 supplies a control signal to a control circuit built in the imaging apparatus CM, thereby controlling the operation of the imaging apparatus. For example, if one imaging mode is selected by the imaging mode selection unit 140, the imaging control unit 140 supplies a control signal regarding a field angle so as to obtain an imaging area corresponding to the selected imaging mode. After the field angle is adjusted in accordance with the supplied control signal, the imaging control unit 140 supplies an imaging control signal to start the imaging.

The line-of-sight direction detection unit 150 is an image processing circuit configured to detect the line-of-sight detection of the user 1 from an imaging result of the imaging apparatus CM, which is temporarily stored in the RAM of the control unit 110. In the imaging apparatus CM, the imaging mode is controlled to be the telephoto mode if the detection of the line-of-sight direction is required, or if the detection of the gesture is not required, as described later. Since the installation position of the imaging apparatus CM is fixed, the line-of-sight direction of the user 1 can be detected from an image of eyes (in particular, pupil periphery) of the user 1 imaged in the telephoto side imaging area, by using known algorithm and arithmetic expressions, after an initial setting process according to a sitting position and posture of the user 1 (or the driver of the vehicle in the example). The detection of the line-of-sight direction hardly correlates with the present invention, and thus, a detailed explanation will be omitted.

The gesture detection unit 160 is a processing circuit configured to detect the gesture of the user 1 from the imaging result of the imaging apparatus CM, which is temporarily stored in the RAM of the control unit 110. Various known image analysis methods, such as a face detection method and a pattern recognition method, can be applied to the detection of the gesture of the gesture detection unit 160.

The display control unit 170 is a control circuit configured to determine information to be displayed on the display DP on the basis of positioning information obtained from a global positioning system (GPS) or the like, and configured to display the information on the display screen via the control of the display DP. Moreover, the display control unit 170 is configured to control a screen configuration of the display screen, including a type or layout of the information to be displayed, according to the state of the user 1. The "state of the user 1" means the line-of-sight direction of the user 1 detected by the line-of-sight direction detection unit 150, the gesture of the user 1 detected by the gesture detection unit 160, or the like.

<Operation of Example>

Hereinafter, the operation of the example will be explained.

<Basic Operation of Information Display System 10>

The information display system 10 according to the example is a type of car navigation system, and display information is determined and displayed on the display DP on the basis of map information, facility information, road information, destination information set in advance, set route information, position information, and the like.

For example, a present position and a moving direction are obtained on the basis of a GPS signal or the like, and the present position and the moving direction are displayed as the position information on a map, from the map information, which is separately obtained. On the other hand, if a near-future travel route is predicted on the basis of the set route information and if some search condition is set at that time point, information regarding a facility or the like that satisfies the search condition in the near-future travel route is displayed. For example, if a "restaurant" is set as the search condition, information regarding the restaurant on the travel route of the vehicle is searched for from the facility information, and is displayed on the display screen in a form of being superimposed on the map information.

Here, the information display system 10 can display optimum information according to the line-of-sight direction and the gesture of the user 1, on the basis of the function as the car navigation system as described above.

For example, if the line-of-sight direction of the user 1 corresponds to a particular position on the display DP, the information that is desired by the user 1 can be displayed at the position. Moreover, for example, if the user 1 points at particular information displayed on the display DP by the gesture, such as a pointing operation, the relevant information can be enlarged, or more detailed information regarding the relevant information can be displayed. As described above, in the information display system 10, the line-of-sight direction of the user land gesture are used to determine the display content of the information.

Here, in order to detect the line-of-sight direction, proper resolution is required for the face of the user 1, particularly for the image of the eye periphery of the user 1. Moreover, in order to detect the gesture, a relatively large imaging area including the upper body of the user 1 is required. There is, however, a cost increase if the imaging apparatus CM is configured to have a wide field angle and high resolution to satisfy the both requirements. In order to achieve both the detection of the line-of-sight direction and the detection of the gesture while preventing the cost increase, the imaging mode control process is performed by the control unit 110 in the example. The imaging mode control process is a process for accurately controlling the imaging area of the imaging apparatus CM.

<Explanation of Imaging Area>

Figure 3:
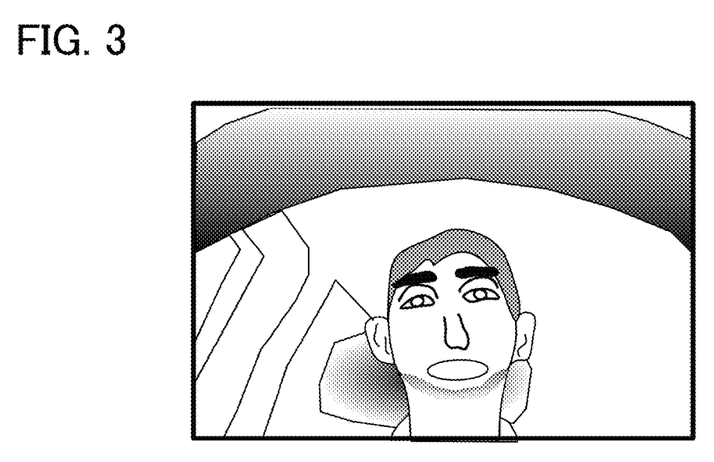
FIG. 3 is a diagram illustrating a telephoto side imaging area in a telephoto mode.
Figure 4:
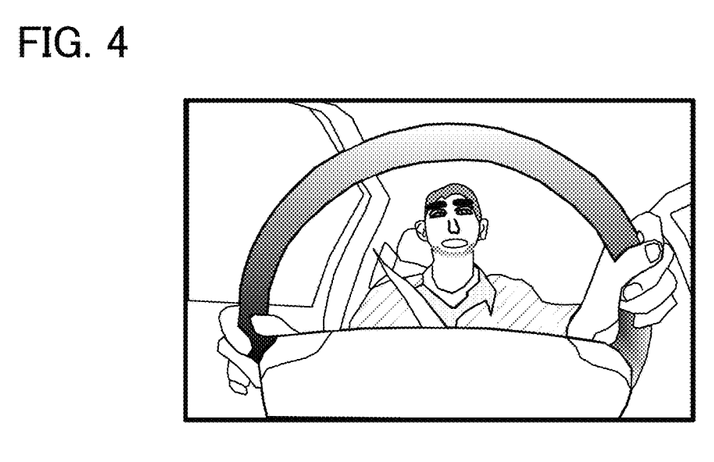
FIG. 4 is a diagram illustrating a wide-angle side imaging area in a wide-angle mode.

Next, with reference to FIG. 3 and FIG. 4, the imaging area of the imaging apparatus CM will be explained. FIG. 3 is a diagram illustrating the telephoto side imaging area. FIG. 4 is a diagram illustrating the wide-angle side imaging area.

In FIG. 3, if the telephoto mode is selected as the imaging mode of het imaging apparatus CM and the imaging area is controlled to be the telephoto side imaging area, a portion of the imaging area of a predetermined ratio or more is occupied by the face of the user 1. Therefore, the image of the user 1 imaged in the telephoto side imaging area is an image suitable for the detection of the line-of-sight direction of the user 1.

The ratio of the face in the telephoto side imaging area (i.e. the aforementioned predetermined ratio) varies depending on three elements, i.e., a distance between the imaging apparatus CM and the user 1, a field angle in the telephoto mode, and optical resolution (e.g. pixel number) of the image sensor. As long as the resolution required for the detection of the line-of-sight direction is obtained in the eye peripheral portion of the user 1, a combination of the three elements may be arbitrarily determined.

On the other hand, in FIG. 4, if the wide-angle mode is selected as the imaging mode of the imaging apparatus CM and the imaging area is controlled to be the wide-angle side imaging area, the imaging area includes the upper body of the user 1. In other words, a wider field angle of the imaging apparatus CM causes the imaging area to be larger than the telephoto side imaging area. Therefore, the image of the user 1 imaged in the wide-angle side imaging area is an image suitable for the detection of the gesture of the user 1.

As is clear from FIG. 3 and FIG. 4, the wide-angle side imaging area is an imaging area including the whole telephoto side imaging area. Moreover, the wide-angle side imaging area is obtained by changing the field angle from the telephoto side imaging area. Therefore, in the wide-angle side imaging area, even if the optical resolution of the image sensor of the imaging apparatus CM is a fixed value, the resolution of the eyeball peripheral portion of the user 1 required for the detection for the line-of-sight direction of the user 1 is lower than that in the telephoto side imaging area.

<Explanation of Imaging Mode Control Process>

Figure 5:
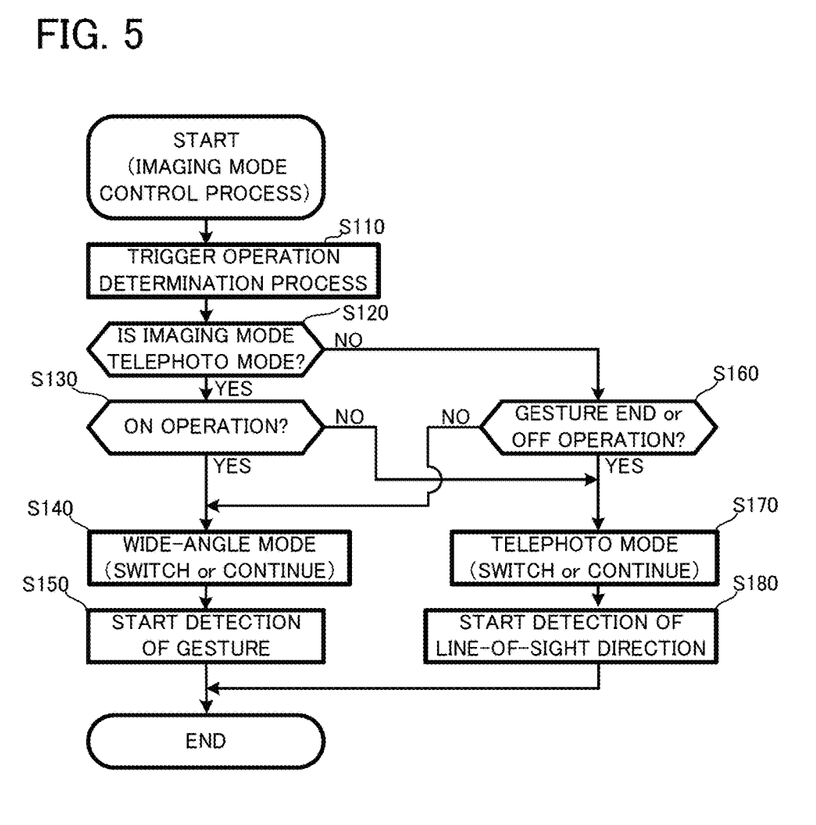
FIG. 5 is a flowchart illustrating an imaging mode control process.

Next, with reference to FIG. 5, the details of the imaging mode control process performed by the control unit 110 will be explained. FIG. 5 is a flowchart illustrating the imaging mode control process. The imaging mode control process is a process repeatedly performed with a predetermined period.

In FIG. 5, the control unit 110 performs a trigger operation determination process (step S110). The trigger operation determination process is a process of determining the presence or absence of the trigger operation of the user 1 and the content thereof.

The trigger operation according to the example includes: the ON operation performed if the user 1 desires information display based on the gesture described above; and the OFF operation performed if the user 1 desires to end the information display based on the gesture, if the desired information display based on the gesture is ended, if the user 1 desires information display based on the line-of-sight direction, or in similar cases. In other words, in the example, the telephoto side imaging area by the telephoto mode is selected as an initial state, and the wide-angle side imaging area by the wide-angle mode is selected if the information display based on the gesture is desired. Such a control aspect, however, is not related to the nature of this application, and can be changed in any manner. A determination result of the trigger operation is temporarily stored in the RAM. The details of the trigger operation will be described later.

If the determination of the trigger operation is ended, it is determined whether or not the imaging mode of the imaging apparatus CM at that time point is the telephoto mode (step S120).

If the imaging mode is controlled to be the telephoto mode (the step S120: YES), it is determined whether or not the trigger operation determined in the step S110 is the ON operation (step S130). If the trigger operation corresponds to the ON operation (the step S130; YES), the wide-angle mode is selected by the imaging mode selection unit 160 as the imaging mode (step S140). If the wide-angle mode is selected, the detection of the gesture based on the image in the wide-angle side imaging area is started by the gesture detection unit 160 (step S150), the imaging mode selection process is ended. As described above, the imaging mode selection process is repeatedly performed with a given period. Therefore, practically, the process is returned to the step S110 while the detection of the gesture is continued after the start of the detection of the gesture.

On the other hand, in the step S120, if the imaging mode at the present time point is the wide-angle mode (the step S120: NO), the control unit 110 determines whether or not the trigger operation determined in the step S110 corresponds to the OFF operation, whether or not the gesture of the user 1 is ended, and whether or not the gesture of the user 1 is not detected in a predetermined period (step S160).

If the trigger corresponds to the OFF operation, if the gesture for information display is ended, or if the gesture of the user 1 is not detected in the predetermined period (the step S160: YES), the telephoto mode is selected by the imaging mode selection unit 160 as the imaging mode (step S170). If the telephoto mode is selected, the detection of the line-of-sight direction based on the image in the telephoto side imaging area is started by the line-of-sight direction detection unit 150 (step S180), the imaging mode control process is ended. As described above, the imaging mode selection process is repeatedly performed with a given period. Therefore, practically, the process is returned to the step S110 while the detection of the line-of-sight direction is continued after the start of the detection of the line-of-sight direction.

Moreover, in the step S160, if the trigger does not correspond to the OFF operation, if the gesture for information display is not ended, and if the gesture of the user 1 is detected in the predetermined period (the step S160: NO), the process is moved to the step S140, and the imaging mode is maintained at the wide-angle mode.

Moreover, in the step S130, if the trigger operation does not correspond to the ON operation (the step S130: NO), the process is moved to the step S170, and the imaging mode is maintained at the telephoto mode. The imaging mode control process is performed in this manner.

Now, an effect of the imaging mode control process will be explained.

<Switching From Wide-Angle Mode to Telephoto Mode>

In the imaging mode control process, if he step S130 branches to the "NO" side or if the step S160 branches to the "YES" side, the imaging mode is switched from the wide-angle mode to the telephoto mode. Namely, the imaging area is switched from the wide-angle side imaging area to the telephoto side imaging area. In this case, the imaging result of the imaging apparatus CM changes from the state illustrated in FIG. 4 to the state illustrated in FIG. 3.

<Switching From Telephoto Mode to Wide-Angle Mode>

In the imaging mode control process, if he step S130 branches to the "YES" side or if the step S160 branches to the "NO" side, the imaging mode is switched from the telephoto mode to the wide-angle mode. Namely, the imaging area is switched from the telephoto side imaging area to the wide-angle side imaging area. In this case, the imaging result of the imaging apparatus CM is illustrated in FIG. 6A and FIG. 6B.

Figure 6A:
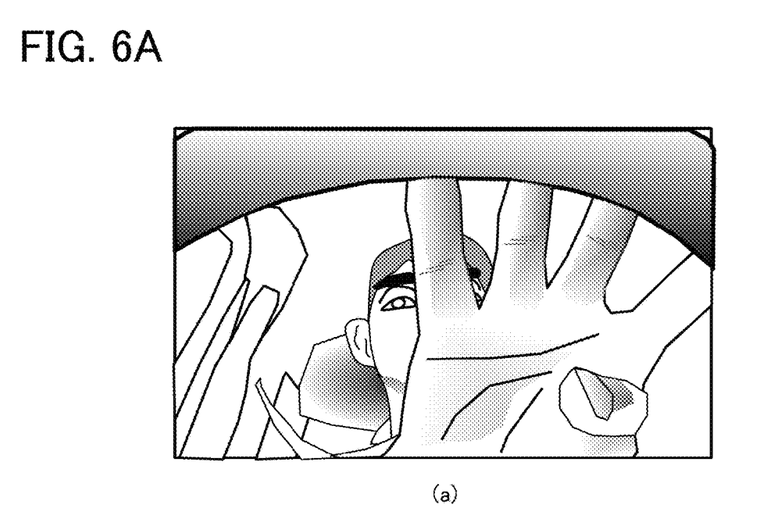
FIG. 6A and FIG. 6B are diagrams illustrating a situation in which a gesture is detected in the telephoto mode.
Figure 6B:
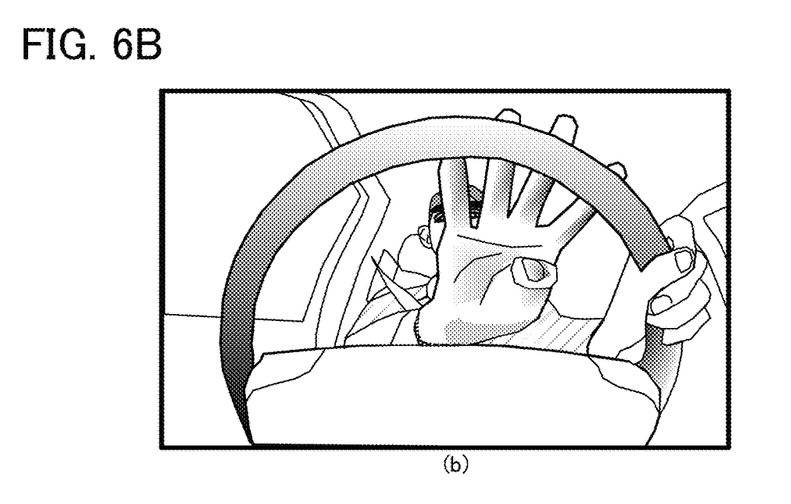

FIG. 6A illustrates a state in which the gesture as the ON operation is detected in the telephoto side imaging area. Namely, here, the gesture is used to determine the trigger operation. On the other hand, FIG. 6B illustrates a state in which the imaging mode is switched to the wide-angle mode in response to the determination of the ON operation.

As described above, according to the imaging mode control process in the example, the imaging mode (which namely uniquely means the imaging area) is quickly switched to one of the wide-angle mode and the telephoto mode that is desired by the user 1, on the basis of the determination result of the trigger operation.

Here, high resolution is required to detect the line-of-sight direction; however, the resolution near the eyes can be relatively improved in an image in the telephoto side imaging area in which the field angle thereof is narrowed and the face of the user 1 is relatively enlarged. On the other hand, if various gestures of the user 1 are detected, the field angle is required more than the resolution. Therefore, the resolution of the imaging apparatus CM may be lower than the resolution when the required resolution near the eyes is to be satisfied in the imaging area having a wider image angle, which is suitable for the detection of the gesture. It is also possible to suppress the cost increase associated with the imaging apparatus CM from the viewpoint of performance and from the viewpoint of an image processing load, while ensuring the accuracy of detecting the line-of-sight direction.

In other words, according to the imaging mode control process in the example, it is possible to perform both the detection of the gesture and the detection of the line-of-sight direction only by using a single imaging apparatus, while suppressing the cost increase.

<Variations of Trigger Operation>

Now, the trigger operation will be explained. There are broadly the following three types of trigger operations (1) to (3). In the information display system 10 according to the example, any of the three types of trigger operations can be used, but of course, it is also possible to use only one of them.

(1) The utterance of the user 1
(2) The operation of the operation switch by the user 1
(3) The gesture of the user 1

The utterance of the user 1 in the item (1) is detected by the voice detection unit 121. For example, if the user 1 utters "Gesture on" or the like, the voice is detected by the voice detection unit 121, and it is determined by the control unit 110 that the voice corresponds to the ON operation described above. Moreover, if the user 1 utters "Gesture off" or the like, the voice is detected by the voice detection unit 121, and it is determined by the control unit 110 that the voice corresponds to the OFF operation described above.

As in the information display system 10 according to the example, the provision of the voice recognition apparatus is not rare in the field of the car navigation apparatus. As described above, the microphone and the voice detection unit 121 do not lead to the cost increase in the case where the original system is provided with the voice recognition apparatus.

The switch operation by the user 1 in the item (2) is detected by the switch state detection unit 122. For example, if the user 1 operates the aforementioned ON switch, the operation is detected by the switch state detection unit 122, and it is determined by the control unit 110 that the operation corresponds to the aforementioned ON operation. Moreover, if the user 1 operates the aforementioned OFF switch, the operation is detected by the switch state detection unit 122, and it is determined by the control unit 110 that the operation corresponds to the aforementioned OFF operation. Alternatively, as opposed to the configuration according to the example, a single switch can be used to determine the ON operation and the OFF operation. Namely, the following determination can be applied; if the switch is operated to be ON, it is determined to be the ON operation, and if the switch is operated to be OFF, it is determined to be the OFF operation. Alternatively, only a switch corresponding to the ON operation may be provided to perform such control that the OFF operation is automatically set if the gesture is not detected for a fixed time may be performed.

The operation switch is a switch provided specially for the detection of the trigger operation, and is thus disadvantage in terms of cost. However, the detection is easier and more accurate than the voice and the gesture.

The gesture of the user 1 in the item (3) is detected by the gesture detection unit 160. If the gesture is used as the trigger operation, the operation detection unit 120, the microphone, and the operation switch are not necessarily required, and the apparatus configuration can be simplified.

Here, there are two types of gestures as the trigger operation, which are namely a gesture set in advance as the trigger operation and a gesture that is differentiated from a gesture used for information display.

In the former case, the gesture corresponding to the ON operation and the gesture corresponding to the OFF operation can be determined in advance. Thus, the determination associated with the ON operation and the OFF operation can be made even on a simple gesture, such as placing/displacing a hand(s) and fingers on the steering wheel HD. As illustrated in FIG. 3, the telephoto side imaging area has a narrow field angle. Thus, in this case, at least the gesture regarding the ON operation needs to be set in the telephoto side imaging area. The gesture illustrated in FIG. 6 is also one example of the gesture as the ON operation performed in the telephoto side imaging area.

In the latter case, a gesture detection function by the gesture detection unit 160 is used. It is thus not necessary to set the gesture specialized in the trigger operation. Therefore, the degree of freedom is ensured for the trigger operation to some extent.

Of course, however, the gesture corresponding to the ON operation in the telephoto side imaging area needs to be performed in the telephoto side imaging area. In other words, in the example, there is prepared a criterion for certainly detecting the gesture corresponding to the ON operation in the telephoto side imaging area having a narrow field angle.

In the telephoto side imaging area having a narrow field angle, the gesture that can be performed by the user 1 is limited. Here, in many cases, as illustrated in FIG. 6A, the face of the user 1 is obstructed by the gesture. This can be used for the detection of the trigger operation by the gesture.

For example, it can be determined whether or not the gesture corresponding to the ON operation is performed, by determining whether the image of the user 1 includes face parts that constitute the face of the user 1, such as a head, a face outline, eyes, a nose, and a mouth. If there are these parts, there is no blocking object between the imaging apparatus CM and the face of the user 1, and it is thus possible to determine that the ON operation is not performed. On the other hand, if there are no these parts, there is a blocking object between the imaging apparatus CM and the face of the user 1, and it is thus possible to determine that the ON operation is performed. The determination of the trigger operation as described above can be realized without an analysis of complicated movements of the fingers, hands or arms, and is thus preferable as the determination of the trigger operation associated with the trigger operation determination process.

However, such a determination method does not necessarily have sufficient accuracy of determining the trigger operation because there are the following cases: namely, a first case in which the parts are blocked even though the user 1 does not perform the ON operation; and a second case in which the parts are not blocked even though the user 1 performs the ON operation.

Figure 7:
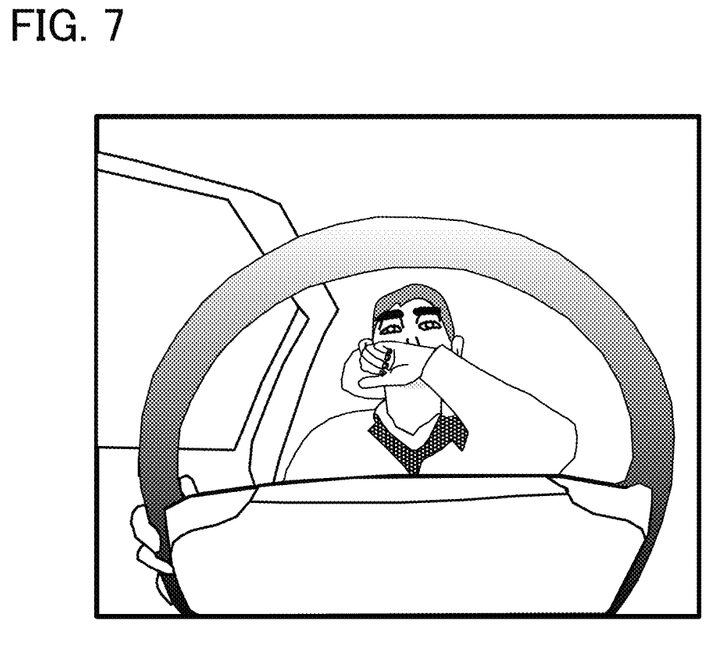
FIG. 7 is a diagram explaining a first case associated with trigger operation determination.

Now, with reference to FIG. 7, the first case will be explained. FIG. 7 is a diagram explaining the first case associated with the trigger operation determination.

In FIG. 7, the user 1 moves his left hand near to his face and checks the time with his watch. Such a time check operation is not related to the information display in the information display system 10 and does not correspond to the gesture.

In this case, however, the face of the user 1 is obstructed to no small extent. Thus, in the criterion, it can be determined that it is the gesture corresponding to the ON operation. Thus, in the period in which the telephoto side imaging area is imaged by the telephoto mode (or in the case where the step S120 branches to the "YES" side), it is erroneously determined to be the ON operation, and the step S130 branches the "YES" side, and the imaging area is switched to the wide-angle side imaging area.

FIG. 7 illustrates the case where the imaging area is switched to the wide-angle side imaging area in the period in which the line-of-sight direction is to be detected in this manner. In this case, a reduction in the ratio of the user 1's face occupied in the imaging area reduces the resolution of the face in comparison with that in the telephoto mode, and thus reduces the accuracy of detecting the line-of-sight direction.

In the example, the step S160 includes a determination element regarding the end of the gesture. In other words, if there is no gesture in a predetermined period after switching to the wide-angle side imaging area, it is considered that the gesture is ended or that the erroneous determination of being the ON operation is made, and the imaging area is returned to the telephoto side imaging area. Therefore, even in the first case, the function of the information display system 10 is not hindered.

Figure 8:
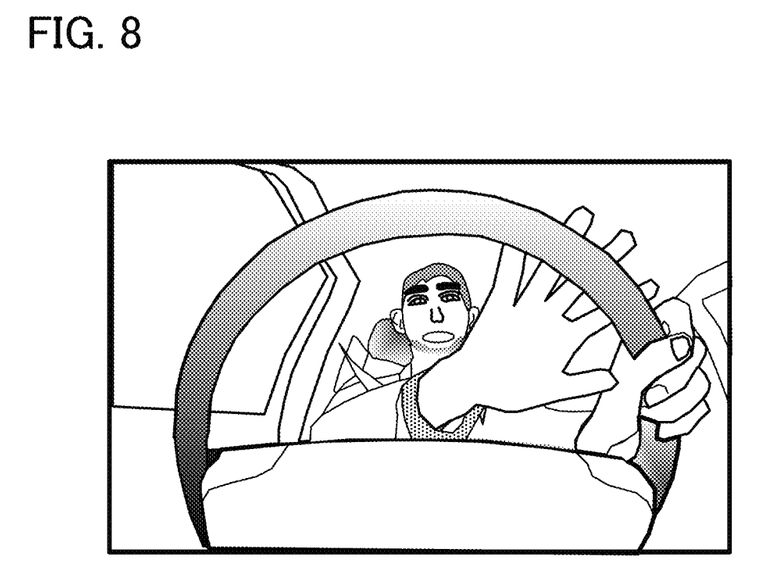
FIG. 8 is a diagram explaining a second case associated with the trigger operation determination.

Next, with reference to FIG. 8, the second case will be explained. FIG. 8 is a diagram explaining the second case associated with the trigger operation determination.

In FIG. 8, the user 1 touches a left upper portion of the steering wheel HD with his right hand. There is a possibility that such an operation is the gesture corresponding to the ON operation in which the user 1 desires the information display based on the gesture.

In this case, however, the face of the user 1 is not obstructed at all, and it is thus not determined that that it is the gesture corresponding to the ON operation in the aforementioned criterion. Thus, in the period in which the telephoto side imaging area is imaged by the telephoto mode (or in the case where the step S120 branches to the "YES" side), it is erroneously determined to be not the ON operation, and the step S130 branches the "NO" side, and the imaging area is maintained at the telephoto side imaging area.

Thus, in the example, not only that face parts of the user 1 are obstructed, which is described above, but also that the user 1 touches the steering wheel HD for a purpose other than the driving operation, are added to the criterion in the trigger operation determination process in the step S110. Namely, if the criterion is applied, the operation illustrated in FIG. 8 is determined to be the ON operation. FIG. 8 illustrates a state in which the imaging area is normally switched to the wide-angle side imaging area in the period in which the gesture is to be detected as described above.

By the way, there is also a possibility that the operation illustrated in FIG. 8 is not necessarily the ON operation. In other words, it is not necessarily easy to accurately differentiate between the normal steering wheel operation and the ON operation as the trigger operation. If it is erroneously determined that the contact with the steering wheel HD is the ON operation, as in the first case, that reduces the ratio of the face of the user 1 occupied in the imaging area and reduces the accuracy of detecting the line-of-sight direction.

In this case, however, there is no problem because the imaging mode is switched from the wide-angle mode to the telephoto mode after a predetermined interval from when the gesture is not detected, as in the first case.

By the way, in the trigger operation determination process, such an erroneous determination that there is the ON operation is more problematic than such an erroneous determination that there is not the ON operation. In other words, in the former case, as described above, the subsequent gesture is not detected, and a fail-safe function is thus started in which the imaging mode is switched to the telephoto mode. In contrast, in the latter case, the imaging mode is not switched to the wide-angle mode even though it is to be switched to the wide-angle mode, and thus, the subsequent gesture of the user 1 is an operation outside the imaging area, and the telephoto mode is continued. In other words, there is a possibility that the information display based on the gesture does not function.

In order to address the problems as described above, in the trigger operation determination process in the step S110, it is easily determined that the ON operation is performed. For example, in all cases that it is not clear whether or not to correspond to the ON operation, it is determined that there is the ON operation. In other words, the imaging mode of the imaging apparatus CM is switched to the wide-angle mode, more easily than in a case where the aforementioned measure is not taken.

However, as opposed to that the gesture of the user 1 is outside the imaging area in the telephoto mode, the wide-angle side imaging area in the wide-angle mode includes the face of the user 1. Therefore, even if the detection accuracy decreases, it is not impossible to detect the line-of-sight direction of the user 1. From the above, relative weighting on the ON operation determination as described above is effective. Moreover, even in the erroneous determination of being the ON operation, the imaging mode is returned to the telephoto mode after a proper time, due to the aforementioned fail-safe function. Even in this point, the weighting is effective.

The present invention is not limited to the aforementioned embodiments and examples, but various changes may be made, if desired, without departing from the essence or spirit of the invention which can be read from the claims and the entire specification. An imaging system which involves such changes is also intended to be within the technical scope of the present invention.

DESCRIPTION OF REFERENCE NUMERALS 1 user
10 information display system
100 control apparatus
CM imaging apparatus
DP display
HD steering wheel
110 control unit
120 operation detection unit
130 imaging mode selection unit
140 imaging control unit
150 line-of-sight detection unit
160 gesture detection unit
170 display control unit

The invention claimed is:

1. An imaging system comprising:
an imaging device having a telephoto mode, in which the imaging device is configured to image a first imaging area, and a wide-angle mode, in which the imaging device is configured to image a second imaging area, which is larger than the first imaging area, the first imaging area being used to detect a user's line-of-sight, the second imaging area being used to detect a gesture including the user's upper body;
a detecting device configured to detect a user's trigger operation to switch between the first imaging area and the second imaging area; and
a controlling device configured to control the imaging device to switch between the telephoto mode and the wide-angle mode based on a detection result of the trigger operation, the controlling device controlling the imaging device to switch from the telephoto mode to the wide-angle mode when the trigger operation is an operation to switch from the first imaging area to the second imaging area, and controlling the imaging device to switch from the wide-angle mode to the telephoto mode when the trigger operation is an operation to switch from the second imaging area to the first imaging area,
wherein the detecting device includes at least one of (i) a microphone configured to detect utterance as the trigger operation, and (ii) a switch configured to detect an input operation as the trigger operation.

2. The imaging system according to claim 1, wherein the second imaging area includes at least a part of the first imaging area, and
a resolution of the first imaging area when the first imaging area is selected is higher than a resolution of the first imaging area when the second imaging area is selected.

3. An imaging method in an imaging system including an imaging device having a telephoto mode, in which the imaging device is configured to image a first imaging area, and a wide-angle mode, in which the imaging device is configured to image a second imaging area, which is larger than the first imaging area, the first imaging area being used to detect a user's line-of-sight, the second imaging area being used to detect a gesture including the user's upper body, said imaging method comprising:
detecting a user's trigger operation to switch between the first imaging area and the second imaging area; and
controlling the imaging device to switch between the telephoto mode and the wide-angle mode based on a detection result of the trigger operation, the imaging device being controlled to switch from the telephoto mode to the wide-angle mode when the trigger operation is an operation to switch from the first imaging area to the second imaging area, and to switch from the wide-angle mode to the telephoto mode when the trigger operation is an operation to switch from the second imaging area to the first imaging area,
wherein the detecting detects at least one of (i) utterance as the trigger operation detected by a microphone, and (ii) an input operation as the trigger operation detected by a switch.

4. A non-transitory computer readable medium on which is stored a computer program for making a computer apparatus function as the imaging system according to claim 1.

5. A non-transitory computer readable medium on which is stored a computer program for making a computer apparatus function as the imaging system according to claim 2.

* * * * *